(12) United States Patent
Takahashi

(10) Patent No.: US 6,910,512 B1
(45) Date of Patent: Jun. 28, 2005

(54) PNEUMATIC TIRE HAVING PERIPHERAL PROTUBERANT PORTION ON EACH BLOCK

(75) Inventor: Fumio Takahashi, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/673,738

(22) PCT Filed: Feb. 22, 2000

(86) PCT No.: PCT/JP00/00994

§ 371 (c)(1),
(2), (4) Date: Oct. 20, 2000

(87) PCT Pub. No.: WO00/50252

PCT Pub. Date: Aug. 31, 2000

(30) Foreign Application Priority Data

Feb. 22, 1999 (JP) .......................................... 11-043208

(51) Int. Cl.[7] ........................ B60C 11/11; B60C 107/00
(52) U.S. Cl. ............................ 152/209.15; 152/209.17; 152/902
(58) Field of Search ....................... 152/209.15, 209.17, 152/902

(56) References Cited

U.S. PATENT DOCUMENTS

| | | | | |
|---|---|---|---|---|
| 1,128,387 A | * | 2/1915 | Tiefenbacher | 152/209.15 |
| 1,210,933 A | * | 1/1917 | Hamm | 152/209.17 |
| 5,435,364 A | * | 7/1995 | Hasegawa et al. | 152/209.18 |
| 5,503,208 A | * | 4/1996 | Kamegawa et al. | |
| 6,076,579 A | * | 6/2000 | Matsumoto | |
| 6,138,728 A | * | 10/2000 | Miyazaki | |
| 6,386,253 B1 | * | 5/2002 | Marriott | |
| 2003/0136487 A1 | * | 7/2003 | Redulescu | 152/209.15 |

FOREIGN PATENT DOCUMENTS

| | | | |
|---|---|---|---|
| DE | 3709427 | * | 9/1988 |
| EP | 240269 | * | 10/1987 |
| EP | 246995 A | | 11/1987 |
| EP | 0 512 825 A1 | | 11/1992 |
| EP | 875403 | * | 11/1998 |
| EP | 875403 A2 | | 11/1998 |
| JP | 62-241709 | * | 10/1987 |
| JP | 2-179508 A | | 7/1990 |
| JP | 3-246104 A | | 11/1991 |
| JP | 6-24213 A | | 2/1994 |
| JP | 7-186623 A | | 7/1995 |
| JP | 7-186630 | | 7/1995 |
| JP | 7-186633 | * | 7/1995 |
| JP | 7-257111 | * | 10/1995 |
| JP | 8-332810 | * | 12/1996 |
| WO | WO 93/21028 | * | 1/1993 |

OTHER PUBLICATIONS

Patent Abstracts of Japan abstracting JP 09–058221 published Apr. 3, 1997.

* cited by examiner

*Primary Examiner*—Steven D. Maki
(74) *Attorney, Agent, or Firm*—Sughrue Mion, PLLC

(57) ABSTRACT

An end of a block 18 formed on a tread surface of a tire is chamfered in such a manner that a curvature of a chamfer increases toward the end of the block. Accordingly, a ground contact pressure which usually increases locally at the end of the block 18 is equalized and handling stability of the tire improves. Particularly, since the curvature changes, the ground contact pressure can be controlled corresponding to an actual distribution of ground contact pressure. As a result, the ground contact pressure can be equalized still further and an improvement in handling stability of the tire is achieved.

11 Claims, 18 Drawing Sheets

F I G. 1
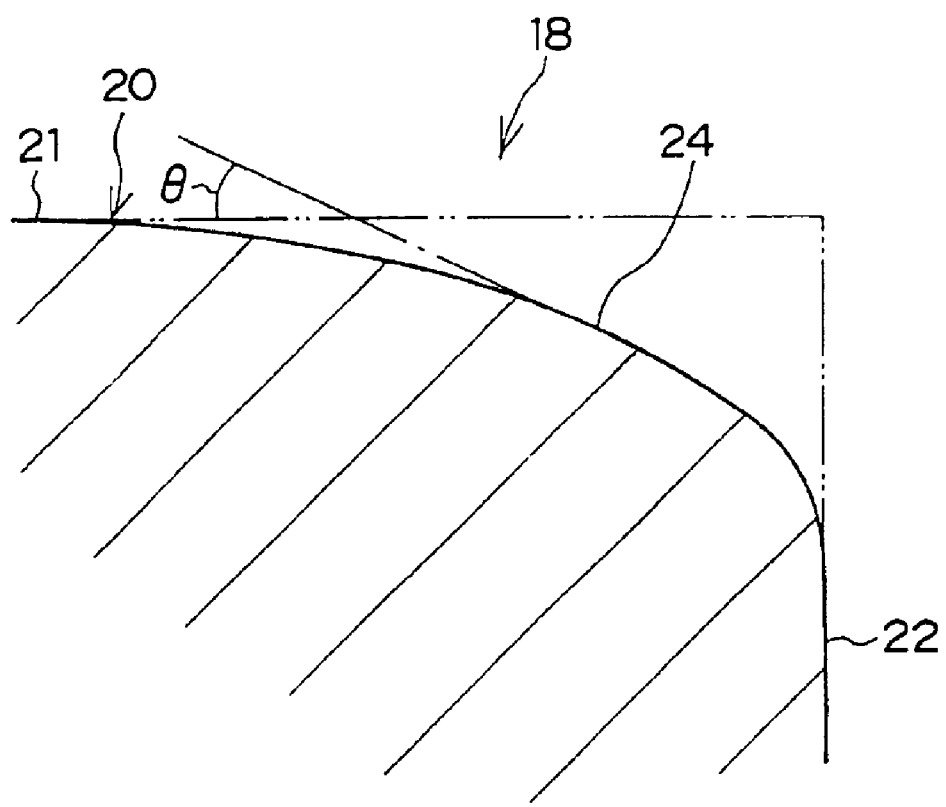

FIG. 12

| No. | HH1 | |
|---|---|---|
| 13-1 | 0.0 | 108 |
| 13-2 | 0.1 | 114 |
| 13-3 | 0.5 | 124 |
| 13-4 | 0.7 | 127 |
| 13-5 | 1.2 | 123 |
| 13-6 | 2.5 | 122 |
| 13-7 | 3.0 | 107 |

(mm)

EVALUATION CONDUCTED WITH ACTUAL VEHICLE

OTHER CONDITIONS

| LL1 | LL2 | HH2 |
|---|---|---|
| 2.5 | 12.5 | 0.15 |

| No. | HH2 | |
|---|---|---|
| 14-1 | 0.0 | 109 |
| 14-2 | 0.1 | 113 |
| 14-3 | 0.5 | 125 |
| 14-4 | 0.7 | 130 |
| 14-5 | 1.2 | 127 |
| 14-6 | 2.5 | 119 |
| 14-7 | 3.0 | 106 |

(mm)

EVALUATION CONDUCTED WITH ACTUAL VEHICLE

OTHER CONDITIONS

| HH1 | LL1 | LL2 |
|---|---|---|
| 0.7 | 2.5 | 12.5 |

| No. | HH2 | HH2/HH1 | |
|---|---|---|---|
| 15-1 | 0.0 | 0.00 | 109 |
| 15-2 | 0.1 | 0.14 | 119 |
| 15-3 | 0.5 | 0.71 | 125 |
| 15-4 | 0.7 | 1.00 | 130 |
| 15-5 | 1.00 | 1.43 | 113 |
| 15-6 | 2.00 | 2.86 | 98 |
| 15-7 | 3.0 | 4.29 | 97 |

(mm)

EVALUATION CONDUCTED WITH ACTUAL VEHICLE

OTHER CONDITIONS

| HH1 | LL1 | LL2 |
|---|---|---|
| 0.7 | 2.5 | 12.5 |

| LL1 | LL2 | LL1/LL2 | |
|---|---|---|---|
| 0.70 | 14.30 | 0.05 | 113 |
| 1.00 | 14.00 | 0.07 | 118 |
| 3.00 | 12.00 | 0.25 | 125 |
| 4.00 | 11.00 | 0.36 | 122 |
| 6.00 | 9.00 | 0.67 | 119 |
| 9.00 | 6.00 | 1.50 | 115 |
| 10.00 | 5.00 | 2.00 | 113 |
| 12.00 | 3.00 | 4.00 | 107 |

(mm)

EVALUATION CONDUCTED WITH ACTUAL VEHICLE

OTHER CONDITIONS

| HH1 | HH2 |
|---|---|
| 0.7 | 0.5 |

| No. | LL1 | HH1/LL1 | |
|---|---|---|---|
| 18-1 | 0.70 | 1.00 | 112 |
| 18-2 | 1.00 | 0.70 | 118 |
| 18-3 | 1.40 | 0.50 | 122 |
| 18-4 | 3.00 | 0.23 | 125 |
| 18-5 | 6.00 | 0.12 | 121 |
| 18-6 | 9.00 | 0.08 | 118 |
| 18-7 | 10.00 | 0.07 | 113 |

(mm)

EVALUATION CONDUCTED WITH ACTUAL VEHICLE

OTHER CONDITIONS

| HH1 | HH2 | LL2 |
|---|---|---|
| 0.7 | 0.5 | 15-LL1 |

| No. | LL2 | HH2/LL2 | |
|---|---|---|---|
| 19-1 | 0.50 | 1.00 | 115 |
| 19-2 | 0.75 | 0.67 | 116 |
| 19-3 | 1.40 | 0.36 | 118 |
| 19-4 | 3.00 | 0.17 | 126 |
| 19-5 | 6.00 | 0.08 | 124 |
| 19-6 | 9.00 | 0.06 | 115 |
| 19-7 | 10.00 | 0.05 | 110 |

(mm)

EVALUATION CONDUCTED WITH ACTUAL VEHICLE

OTHER CONDITIONS

| HH1 | LL1 | HH2 |
|---|---|---|
| 0.7 | 15-LL2 | 0.5 |

(mm)

F I G. 2 1
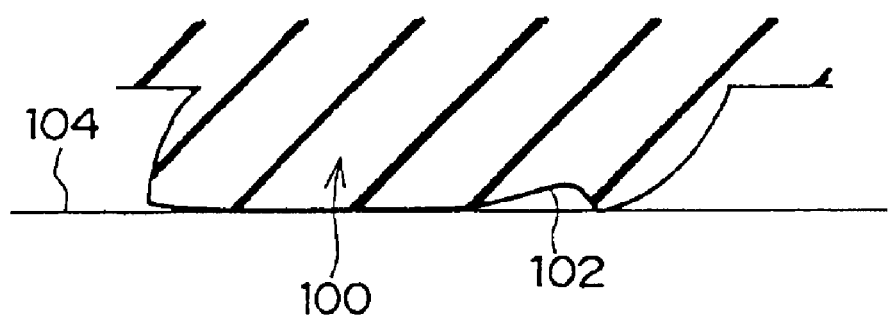

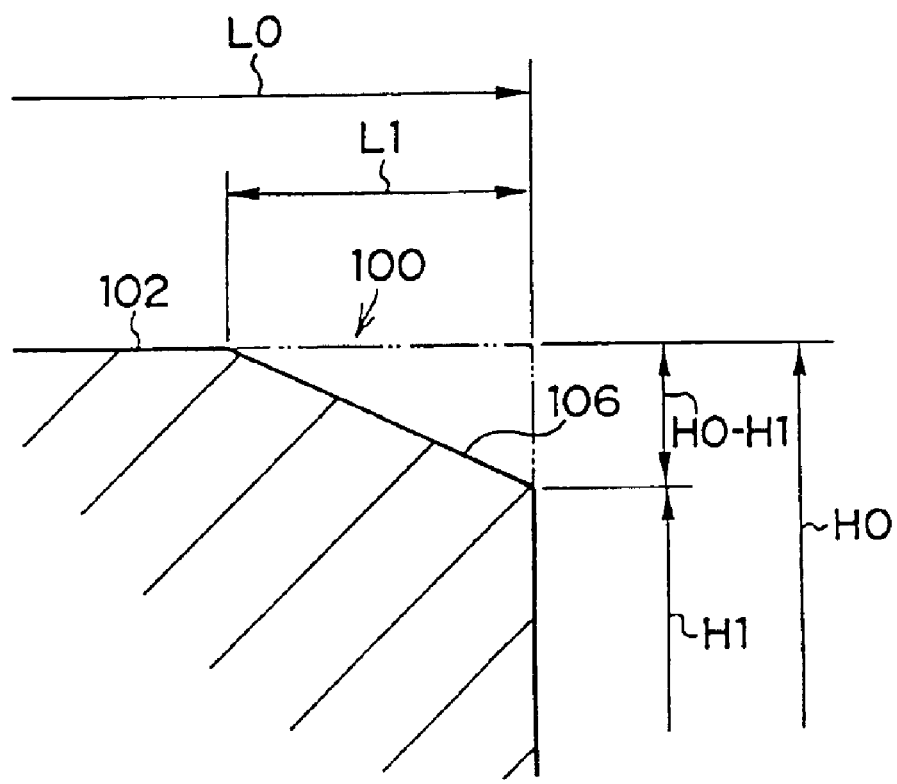

PNEUMATIC TIRE HAVING PERIPHERAL PROTUBERANT PORTION ON EACH BLOCK

FIELD OF THE INVENTION

The present invention relates to a pneumatic tire improved in handling stability.

BACKGROUND ART

In conventional pneumatic tires, normally, the height of each block is fixed (see FIG. 19).

The block 100 deforms (at the time of running) as shown in FIG. 20B, and a ground contact pressure of a tread surface 102 becomes ununiform (that is, the ground contact pressure becomes higher at ends of the block; see FIG. 20A). Therefore, it becomes difficult that braking force or driving force be transmitted from the entire tread surface 100 to a road surface 104.

A portion of the block 100 is worn down in an early stage due to the ununiformity of ground contact pressure, that is, uneven wear is apt to occur. Further, when shear stress caused by local concentration of ground contact pressure is input, only a region in the vicinity of a ground contact end of the block 100 at an input side of shear stress contacts the road surface locally in high pressure, and the tread surface 102 is turned up (see FIG. 21). As a result, the handling stability of tires is adversely affected.

In order to improve ground contact characteristics of tires, improvements of a tread pattern and the like have conventionally been made. However, under the existing circumstances, there is a limit to the improvement because the aspect of water drainability or the relationship with other various characteristics must be considered simultaneously.

Further, there has also been made an improvement in which a region in the vicinity of the ground contact end of the block is chamfered for the purpose of making the ground contact pressure uniform. For example, it is general that an end 106 in which the ground contact pressure concentrates be tapered as shown in FIG. 22 or be chamfered substantially in an R-shaped manner as shown in FIG. 23.

In order that the ground contact pressure be made uniform by chamfering the block in an R-shaped manner, it is not necessary that the R-shaped curved surface be tangent to a groove surface 108 at the ground contact end of the block.

Accordingly, it is known that chamfering in which an R-shaped curved surface only tangent to the ground contact surface is provided as shown in FIG. 24, is very effective.

However, since a single curvature is used in the above-described chamfers, the effect of equalizing the ground contact pressure is not sufficiently obtained, although the ground contact pressure at the end of the block is reduced.

It is necessary for the purpose of further improvement in handling stability that the shape of the chamfer faithfully corresponds to the ground contact pressure distribution.

Further, as disclosed in Japanese Patent Application Laid-Open (JP-A) No. 62-279105, a technique has been proposed in which a convex (chamfered) shape is formed at an upper portion of a block and along a circumferential or transverse direction of a tire. However, it is hard to obtain a tread surface of the block in which the above-described effect consists with other various characteristics only by using such technique. Furthermore, normally, determination of the shape of the tread surface is based on trial and error, and is also attended with difficulties.

The reason why is described below.

First, the distribution of ground contact pressure depends on the configuration of a tread pattern and is affected by deformation of the block to which input is applied (for example, deformation from the state of FIG. 19 to that of FIG. 20B, or deformation from the state of FIG. 19 to that of FIG. 21). Therefore, it is difficult to predict the distribution.

Further, there are various inputs applied to tires, and it is therefore very difficult to uniquely determine an aim for improvement suitable for all of the inputs.

Accordingly, a technique is demanded in which a method for changing a distribution of chamfer on the surface of the block is uniquely defined.

It is therefore an object of the present invention to provide a pneumatic tire in which ununiformity of ground contact pressure, is prevented by defining a proper height of each block on the tread pattern, and handling stability and uneven wear resistance are

MEANS FOR SOLVING THE PROBLEM

In order to solve the above-described problems, there is provided a pneumatic tire in which a plurality of blocks demarcated by circumferential grooves extending in a circumferential direction of the tire and grooves intersecting the circumferential grooves, are provided on a tread, wherein at least a portion of a block edge is chamfered from the side of a block center to a groove wall surface of each of the blocks; a heightwise cross sectional form of a chamfer portion perpendicular to the groove wall surface is formed by a combination of a plurality of chamfer forms; and an angle formed by a tangential line of the chamfer portion with respect to a horizontal extension line of the surface of the block center in a heightwise cross section perpendicular to the groove wall surface increases from the side of the block center to the side of the block end.

The cross sectional form of the chamfer portion is provided such that the block central side thereof (a portion of the cross sectional form of the chamfer portion on the block central side) is formed as a straight line portion and the block end side thereof (a portion of the cross sectional form of the chamfer portion on the block end side) is formed by at least one curved line portion having a fixed curvature.

The cross sectional form of the chamfer portion is comprised of two curved line portions having different curvatures.

When in the heightwise cross section perpendicular to the groove wall surface, a length of the chamfer portion measured along a horizontal extension line of the surface of the block central portion is represented by L1 and a likewise measured length of the block is represented by L0, the ratio L1/L0) is in the range from 0.02 to 0.3.

A distance, measured along a radial direction of the tire, between the horizontal extension line of the surface of the block central portion and an intersection point of the chamfer portion and the groove wall surface is in the range from 0.10 mm to 2.50 mm.

When a heightwise distance between a groove bottom of the block and the intersection point of the chamfer portion and the groove wall surface is represented by H1 and the maximum height of the block is represented by H0, the ratio H1/H0 is greater than or equal to 0.75 and less than 1.0.

The cross sectional form of the chamfer portion changes at a peripheral edge of the block for each portion of the block.

A peripheral protuberant portion is formed on a tread surface of the block in the vicinity of the end edge thereof in such a manner that the height of the block gradually decreases toward the block end edge, to define the chamfer portion, and also toward the central portion of the block.

The peripheral protuberant portion is formed in at least both end edge portions of the block in the cross section of the block taken along the heightwise direction.

The peripheral protuberant portion is disposed in vicinities of the end edges at both sides of the block in the circumferential direction of the tire.

The peripheral protuberant portion is disposed in vicinities of the end edges at both side of the block in the transverse direction of the tire.

A dimension HH1 measured along a radial direction of the tire, between an intersection point of a groove wall surface of the block and the peripheral protuberant portion, and a height position of a top of the peripheral protuberant portion is in the range from 0.1 to 2.5 mm.

A dimension HH2 measured along the radial direction of the tire, between a maximum depth portion in a central region of the block and the height position of the top of the peripheral protuberant portion is in the range from 0.1 to 2.50 mm.

The ratio between the dimension HH1 measured along a radial direction of the tire, between an intersection point of a groove wall surface of the block and the peripheral protuberant portion, and a height position of a top of the peripheral protuberant portion, and the dimension HH2 measured along the radial direction of the tire, between a maximum depth portion in a central region of the block and the height position of the top of the peripheral protuberant portion, that is, HH2/HH1, is 1.5 or less.

A dimension LL1 measured in a direction of the tread surface, between the intersection point of the groove wall surface of the block and the peripheral protuberant portion, and the top of the peripheral protuberant portion is 10.0 mm or less.

With respect to the dimension LL1 measured in a direction along the tread surface between the intersection point of the groove wall surface of the block and the peripheral protuberant portion and the top of the peripheral protuberant portion, and a dimension LL2 measured in the direction along the tread from the top of the peripheral protuberant portion to the maximum depth portion in the central region of the block, LL1/LL2 is 2.0 or less.

With respect to the dimension HH1 measured along a radial direction of the tire, between an intersection point of a groove wall surface of the block and the peripheral protuberant portion, and a height position of a top of the peripheral protuberant portion, and the dimension LL1 measured in a direction along the tread surface, between the intersection point of the groove wall surface of the block and the peripheral protuberant portion, and the top of the peripheral protuberant portion, HH1/LL1 is 1.0 or less.

With respect to the dimension HH2 measured along the radial direction of the tire between a maximum depth portion in a central region of the block and the height position of the top of the peripheral protuberant portion, and the dimension LL2 measured in the direction along the tread from the top of the peripheral protuberant portion to the maximum depth portion in the central region of the block, HH2/LL2 is 1.0 or less.

The ratio between the maximum height H0 and the minimum height T1 of the block, that is, T1/H0 is set in the range of $0.75 \leq T1/H0 < 1.0$.

The peripheral protuberant portion is formed along an entire periphery of the end edge portion of the block.

EFFECTS OF THE INVENTION

As illustrated in FIG. 20A, the ground contact pressure distribution of each of blocks formed on a tread gradually increases from a central portion C to ends of the block and becomes high locally at the ends.

It was considered from the above-described fact that an angle of inclination (including a curvature) of the chamfer portion be preferably made larger toward the end of the block as shown in FIG. 1.

The "angle of inclination" mentioned herein is an angle formed by an extension line of the surface at the central portion of the block tread surface in a cross sectional form of the block with respect to a tangential line of the chamfer portion.

Due to the above-described structure or due to a combination of a plurality of chamfer forms, correction of the ground contact pressure corresponding to ununiformity of the ground contact pressure, which conventionally could not be corrected, becomes possible, and the ground contact pressure on the block tread surface can be equalized further.

As a result, handling stability of the tire improves.

In the above-described structure, a portion of the block in which the ground contact pressure does not change so much (that is, the side of the center of the block) is formed as a straight line (a fixed angle of inclination) portion and a portion of the block in which the ground contact pressure changes greatly (that is, the side of the block end) is formed by at least one curved line portion having a fixed curvature. Therefore, although it is a simple structure, the ground contact pressure can be equalized.

Due to the above-described structure, the side of the center of the block in which the ground contact pressure does not change so much, and the side of the block end in which the ground contact pressure changes greatly, are formed by two curved line portions having different curvatures. Therefore, in spite of a simple structure, equalization of the ground contact pressure can be accomplished.

Further, when the side of the center of the block is formed as a straight line portion, only the side of the block end can be formed by two curved line portions having different curvatures. As a result, the ground contact pressure can be equalized still more.

When L1/L0 is less than 0.02, an effect of equalizing the ground contact pressure of the block tread surface by the chamfer portion is small.

On the other hand, when L1/L0 is more than 0.3, the area of the central portion of the block decreases and there is a possibility that the handling stability may be deteriorated.

Accordingly, it is preferable that L1/L0 is in the range from 0.02 to 0.3.

When the distance measured, along a radial direction of the tire, between an extension line of the surface of the block central portion and an intersection point of the chamfer portion and the groove wall surface is less than 0.10 mm, an effect of equalizing the ground contact pressure by the chamfer portion is small. On the other hand, when the distance is greater than 2.50 mm, the ground contacting area decreases and the handling stability of the tire is deteriorated.

When H1/H0 is less than 0.75, the ground contacting area decreases and the handling stability of the tire is deteriorated. On the other hand, when the H1/H0 is 1.0 or more, an effect of equalizing the ground contact pressure by the chamfer portion is small.

The distribution of ground contact pressure between ends of the block varies depending on the measured direction (i.e., in the circumferential direction of the tire or in the transverse direction of the tire) or depending on the distance from a corner of the block.

Accordingly, due to the shape of the chamfer portion provided to correspond to the distribution of ground contact pressure being changed at a peripheral edge of the block, the ground contact pressure on the tread surface is equalized further.

When the conventional block whose height is fixed contacts the road surface, the ground contact pressure particularly becomes especially large at a ground contacting end of the block and becomes large at the central portion of the block, and relatively becomes small in a region of the block between the ground contacting end and the central portion (see FIG. 20A). As illustrated in FIG. 16, when the peripheral protuberant portion 20 is formed on the tread surface of the block 18 in the vicinity of the end edge of the block in such a manner that the height thereof gradually decreases toward the end edge of the block and toward the central portion of the block, the height of each of regions of the block at both sides of the peripheral protuberant portion 20, that is, the height of the block at the sides of the end edge and the central portion is lower than the peripheral protuberant portion 20. Accordingly, the ground contact pressure at the sides of the end edge and at the central portion of the block can be reduced and ununiformity of the ground contact pressure can be prevented.

The circumferential grooves may be disposed parallel to the circumferential direction of the tire or may be inclined to the circumferential direction of the tire to a certain extent.

The lateral (direction) grooves may merely intersect the circumferential (direction) grooves at the least. The lateral grooves may be disposed parallel to the transverse direction of the tire or may be inclined with respect to the transverse direction of the tire to a certain extent.

Further, in order to prevent uneven wear which is locally caused by an ununiform distribution of the ground contact pressure, the peripheral protuberant portion is preferably raised by a gradual slope, that is, a contour line of the tread surface of the block in the cross section along the heightwise direction is preferably formed by a smooth curved line.

In the pneumatic tire, the peripheral protuberant portion is formed in at least both end edge portions of the block in the cross section along the heightwise direction of the block. Therefore, ununiformity of the ground contact pressure in at least the vicinities of both end edges of the block can be suppressed and the ground contact pressure can be made uniform along the cross sectional direction of the block.

In the pneumatic, the peripheral protuberant portion is disposed at both sides of the block in the circumferential direction of the tire, and therefore, ununiformity of the ground contact pressure of the block in the circumferential direction of the tire can be suppressed. As a result, an extremely local deformation of the block caused by braking/driving force is prevented and the handling stability improves. Further, uneven wear in the vicinity of the block end in the circumferential direction of the tire, which is caused by ununifornity of the ground contact pressure of the block in the circumferential direction of the tire, can be prevented.

Furthermore, since the peripheral protuberant portion is formed at both sides of the block in the circumferential direction of the tire, directionality of the tire is not caused.

When the peripheral protuberant portion is formed on the tread surface of the block in the vicinities of the end edges of the block in the transverse direction of the tire in such a manner that the height thereof gradually decreases from the top of the peripheral protuberant portion, which is disposed toward the center of the block from the end edge of the block in the transverse direction of the tire, to the central portion of the block in the transverse direction of the tire and to the end edges of the block in the transverse direction of the tire, the ground contact pressure at ground contacting ends of the block in the transverse direction of the tire can be reduced and ununiformity of the ground contact pressure of the block in the transverse direction of the tire can be suppressed.

Accordingly, occurrence of uneven wear in the vicinities of the block ends in the transverse direction of the tire, which is caused by ununiformity of the ground contact pressure of the block in the transverse direction of the tire can be prevented.

So long as the dimension HH1 is a positive value, an aim to alleviate concentration of the ground contact pressure is achieved. Therefore, the range of the dimension in which a desired effect is produced is wide.

However, a deformation of the block is limited under application of input to the tire. For this reason, when the dimension HH1 is too large, (one or) some part of the tread surface of the block does not contact the road surface. That is, the ground contacting area of the block decreases.

Accordingly, the upper limit of the dimension HH1 is set to be 2.5 mm so as to prevent an extreme decreasing the ground contacting area.

On the other hand, when the dimension HH1 is less than 0.1 mm, an effect of reducing the ground contact pressure of the end edge of the block is small and an effect of preventing ununiformity of the ground contact pressure may not be sufficiently obtained.

Accordingly, the dimension HH1 is in the range from 0.1 to 2.5 mm.

The dimension HH1 is more preferably in the range from 0.3 to 1.0 mm.

When the dimension HH2 measured, along the radial direction of the tire, between a maximum depth portion at the central region of the block (that is, the lower end of the bottom of the peripheral protuberant portion) and the height position of the top of the peripheral protuberant portion is 0.1 mm or more, the ground contact pressure at the central portion of the block can reliably be reduced.

An optimum value of the dimension HH2 is determined for each portion of the block depending on the compressive rigidity and shape of the block. The effect of the invention is produced when the dimension HH2 is greater than 0. That is, so long as the dimension HH2 is a positive value, an aim at improvement is achieved.

However, if this value is too large, the ground contacting area decreases (the central portion of the block does not contact the road surface), and deterioration in tire performances is caused. Therefore, the range of the dimension in which an excellent effect is produced and the performances are maintained is 0.1 to 2.5 mm.

When HH2/HH1 is 1.5 or less, in the ground contact pressure distribution at the time of the block contacting the road surface, the ground contact pressure of the maximum depth portion (in the vicinity of the central portion of the block) and the ground contact pressure of the top of the peripheral protuberant portion approximate to each other. Further, when HH2/HH1 is 1.0 or less, the ground contact pressure in the vicinity of the maximum depth portion and the ground contact pressure of the top of the peripheral protuberant portion further approximate to each other. Therefore, this range is preferable.

On the other hand, when HH2/HH1 is more than 1.5, the ground contact pressure in the vicinity of the maximum depth portion and the ground contact pressure of the top of the peripheral protuberant portion are different from each other, and equalization of When the dimension LL1 is 10.0 mm or less, the ground contact pressure can be equalized still more. When the dimension LL1 is set outside the above-described range, there is a possibility that the ground contact pressure may be made ununiform.

The dimension LL1 is preferably in the range from 1.5 to 6.0 mm, more preferably in the range from 1.5 to 4.0 mm.

When the dimension HH1 is fixed and the dimension LL1 is variable, the shorter the dimension LL1 becomes, the steeper the slope in the region is. The longer the dimension LL1 becomes, the shallower the slope in the region is.

When it is considered that the block size is fixed, the dimension LL2 is determined depending on the dimension LL1. In the general rectangular block, it is ideal in terms of a compressive rigidity distribution that the central portion of the block in section is smoothly recessed. In order to equalize the distribution of ground contact pressure, desirably, the dimension LL2 is made larger than the dimension LL1

In a block pattern having a special configuration, partial inversion of ground contact pressure may be caused depending on the cross sectional form. In this case as well, in most of arbitrary cross sectional forms, LL1/LL2 is 2.0 or less. Therefore, an excellent effect can be expected.

When the dimension HH1 is less than or equal to the dimension LL1 in the cross sectional form of the block, an effect of equalizing the ground contact pressure distribution is enhanced.

The reason therefor is given by deformation of the block. It is necessary that the curved line of the tread surface in the cross section of the block is smooth to a certain extent.

The reason is that the block end is lifted up from the road surface in an excessively sharply curved line, so that the ground contacting area of the block decreases and ununiformity of the ground contact pressure is caused at the block end.

Accordingly, when HH1/LL1 is 1.0 or less, a uniform state of the ground contact pressure is obtained.

When the dimension HH2 is less than or equal to the dimension LL2 in the cross section of the block, an effect of equalizing the ground contact pressure distribution is enhanced.

The reason therefor is given by deformation of the block. It is necessary that the curved line of the tread surface in the cross section of the block is smooth to a certain extent.

The reason is that the block end is lifted up from the road surface in an excessively sharply curved line, so that the ground contacting area decreases and ununiformity of the ground contact pressure is caused at the block end.

Accordingly, when HH2/LL2 is 1.0 or less, a uniform state of the ground contact pressure is obtained.

When T1/H0 is less than 0.75, a region of the block having the minimum height T1, that is, a low region of the block does not contact the road surface and there is a possibility that the ground contacting area of the block may decrease. On the other hand, when T1/H0 is 1, an effect of reducing the ground contact pressure is not obtained. Accordingly, in order to maintain the ground contacting area of the block and to reliably obtain the effect of reducing the ground contact pressure, T1/H0 is preferably set such that $0.75 \leq T1/H0 < 1.0$.

The peripheral protuberant portion is formed along the entire periphery of the end edge of the block, and therefore, ununiformity of the ground contact pressure can be suppressed over the entire periphery of the end edge of the block and the vicinity thereof irrespective of the shape of the block.

BRIEF DESCRIPTION OF THE DRAWINGS

FIG. 12 is a table showing evaluation results obtained from an actual vehicle when the value of HH1 is changed.

FIG. 13 is a table showing evaluation results obtained from an actual vehicle when the value of HH2 is changed.

FIG. 14 is a table showing evaluation results obtained from an actual vehicle when the ratio HH2/HH1 is changed.

FIG. 15 is a table showing evaluation results obtained from an actual vehicle when the ratio LL1/LL2 is changed.

FIG. 16 is a table showing evaluation results obtained from an actual vehicle when the ratio HH1/LL1 is changed.

FIG. 17 is a table showing evaluation results obtained from an actual vehicle when the ratio HH2/LL2 is changed.

FIG. 19 is a cross sectional view of a block in a conventional tire.

FIG. 21 is a diagram showing a deformation state of a block in the conventional pneumatic tire.

FIG. 22 is a cross sectional view showing an end of a block and the vicinity thereof in a conventional example.

BEST MODES FOR CARRYING OUT THE INVENTION

[First Embodiment]

A description will be given in detail of a pneumatic tire according to a first embodiment of the present invention. Referring now to FIGS. 1 to 4, the present embodiment will be described.

Figure 2:
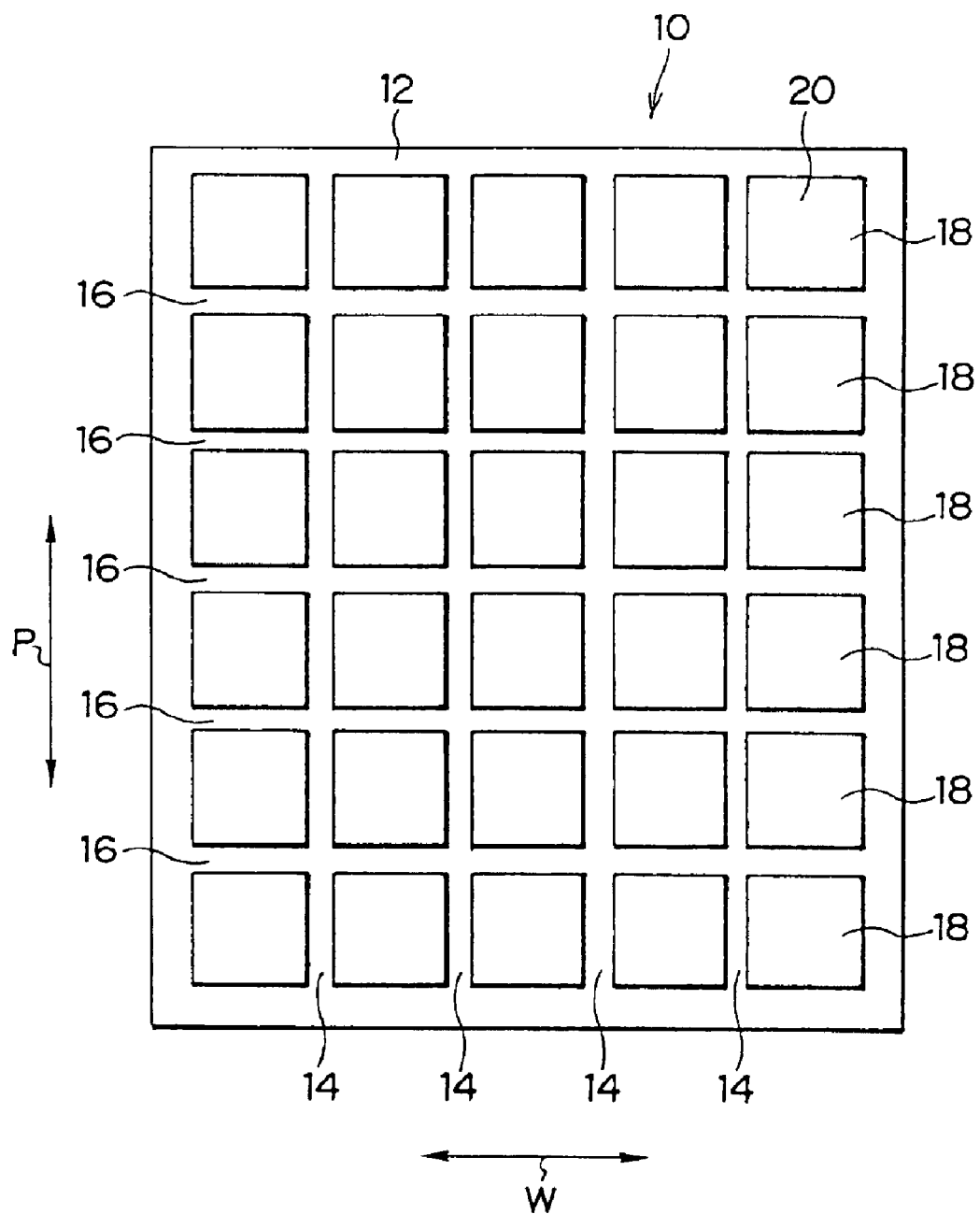
FIG. 2 is a plan view of a tread according to the first embodiment of the present invention.

As illustrated in FIG. 2, a pneumatic tire 10 includes a cylinder-shaped tread 12 extending between a pair of side walls (not shown) disposed parallel to each other.

The tread 12 comprises a plurality of main grooves 14 formed along a circumferential direction of the tire (that is, the direction indicated by arrow P), and a plurality of lug grooves 16 formed along a transverse direction of the tire (that is, the direction indicated by arrow W). A plurality of blocks 18 are demarcated by the main grooves 14 and the lug grooves 16.

These blocks 18 are each formed substantially into a rectangular parallelepiped in which a tread surface 20 is a square whose lengths in transverse and circumferential directions of the tire are equal to each other.

An end on the tread surface 20 of the block 18 is chamfered (a portion subjected to chamfering is hereinafter referred to as a chamfer portion 24).

Figure 1:
FIG. 1 is a cross sectional view showing an end of a block and the vicinity thereof according to a first embodiment of the present invention.

A cross sectional form (of only the end of the block 18 and the vicinity thereof of the block 18 in a direction oriented from a groove wall surface 22 tangent to the chamfer portion 24 of the block 18 toward a side wall opposite to the groove wall surface 22 so as to be substantially perpendicular to the groove wall surface 22, is shown in FIG. 1.

As described above, the cross sectional form of the chamfer portion 24 is formed in such a manner that a curvature of the chamfer portion 24 gradually increases from a central side of the block 18 to the groove wall surface 22 in the vicinity of the end of the block 18 (that is, an angle of inclination θ is made larger). Particularly, the curvature of the chamfer portion 24 is remarkably increased in the vicinity of the groove wall surface 22.

A portion at the center of the tread surface 20 in the block 18, which is not chamfered, is hereinafter referred to as a central portion 21.

Operations of the pneumatic tire 10 having the above-described structure will be described hereinafter.

Figure 20A:
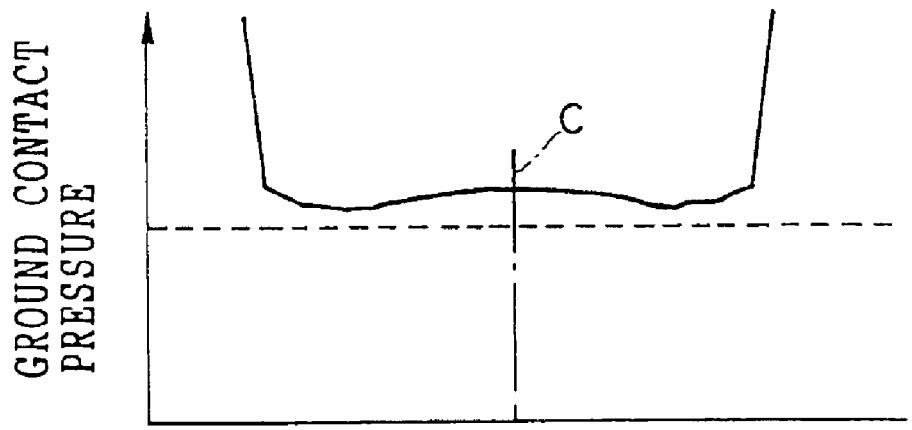
FIG. 20A is a diagram showing ground contact pressure distribution in a conventional pneumatic tire.
Figure 20B:
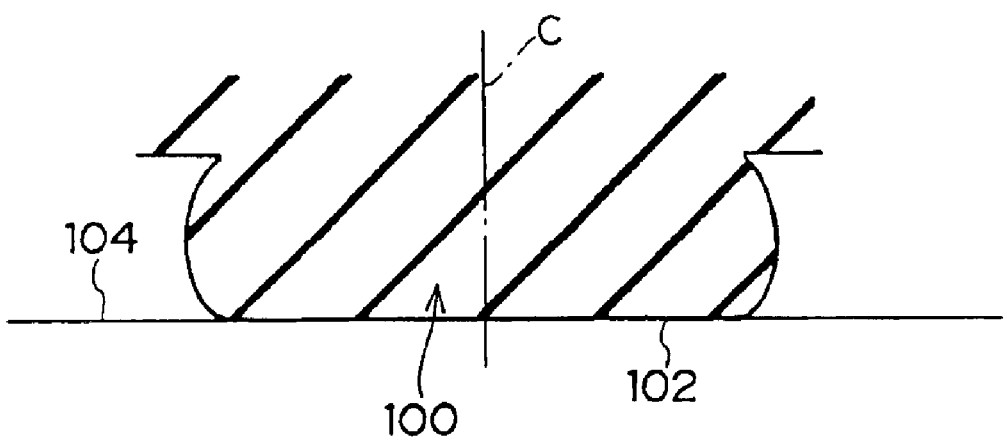
FIG. 20B is a diagram showing a deformed block in the conventional pneumatic tire.
Figure 23:
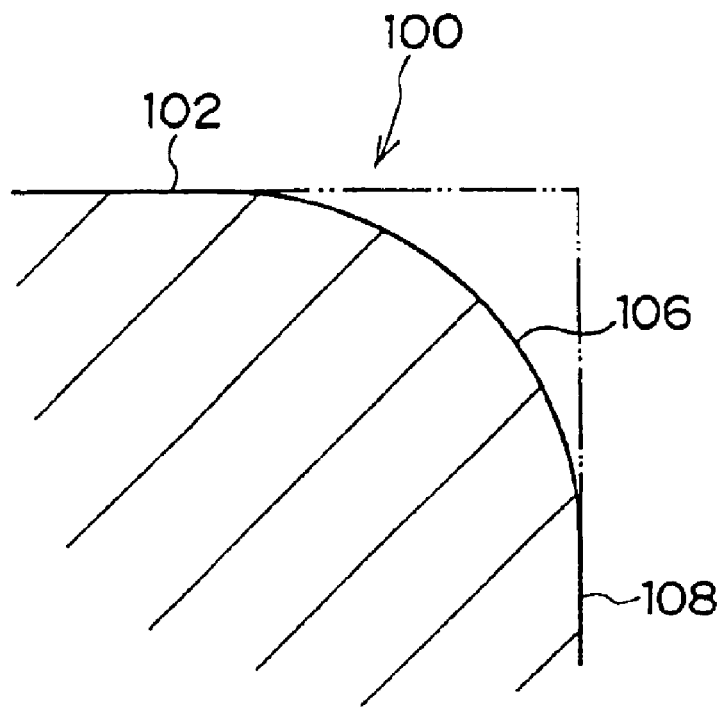
FIG. 23 is a cross sectional view showing an end of a block and the vicinity thereof in another conventional example.

That is, the chamfer portion 24 is formed such that the curvature thereof gradually increases toward the vicinity of the groove wall surface (see FIG. 20A) in which the ground contact pressure remarkably increases. Therefore, an amount by which the ground contact pressure is suppressed increases toward the vicinity of the groove wall surface 22 at which the ground contact pressure becomes maximum, and the ground contact pressure on the tread surface 20 is equalized.

It is, however, ideal but complicated that a subtle change of the curvature as represented by various functions be realized by a finished product.

Accordingly, there is considered a simplified structure in which a block-center side 24A and a block-end side 24B (near the groove wall surface 22) in the chamfer portion 24 are chamfered in different ways.

Figure 3:
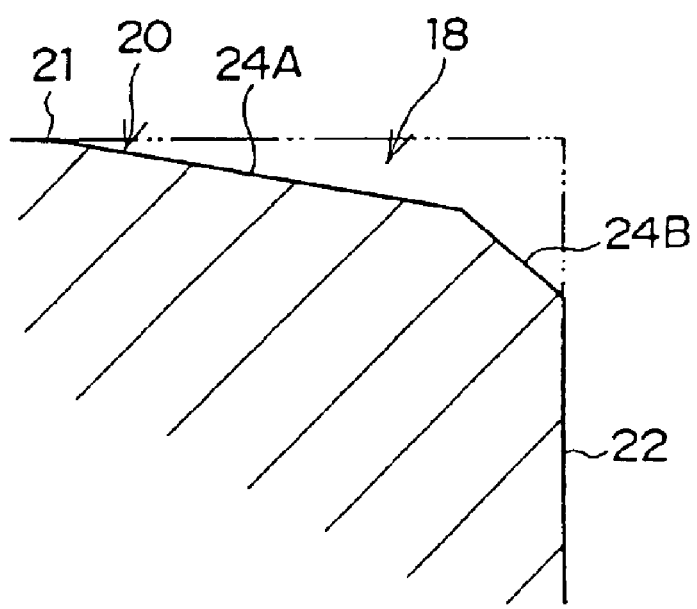
FIG. 3 is a cross sectional view showing an end of a block and the vicinity thereof according to another example of the present invention.
Figure 4:
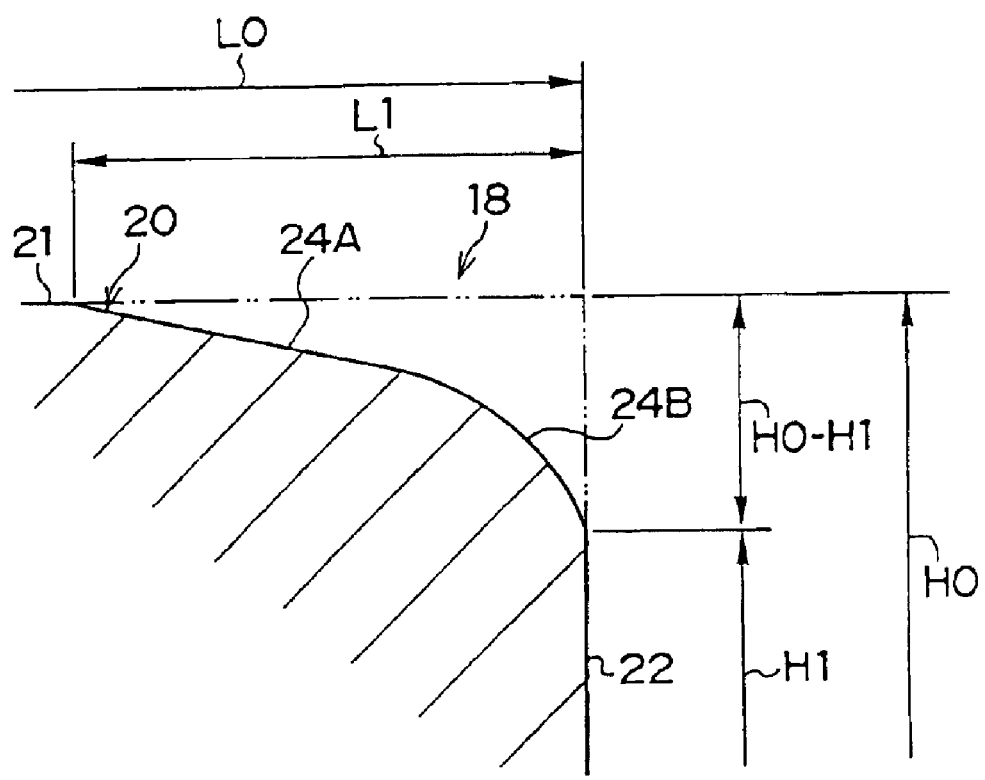
FIG. 4 is a cross sectional view showing an end of a block and the vicinity thereof according to still another example of the present invention.
Figure 5:
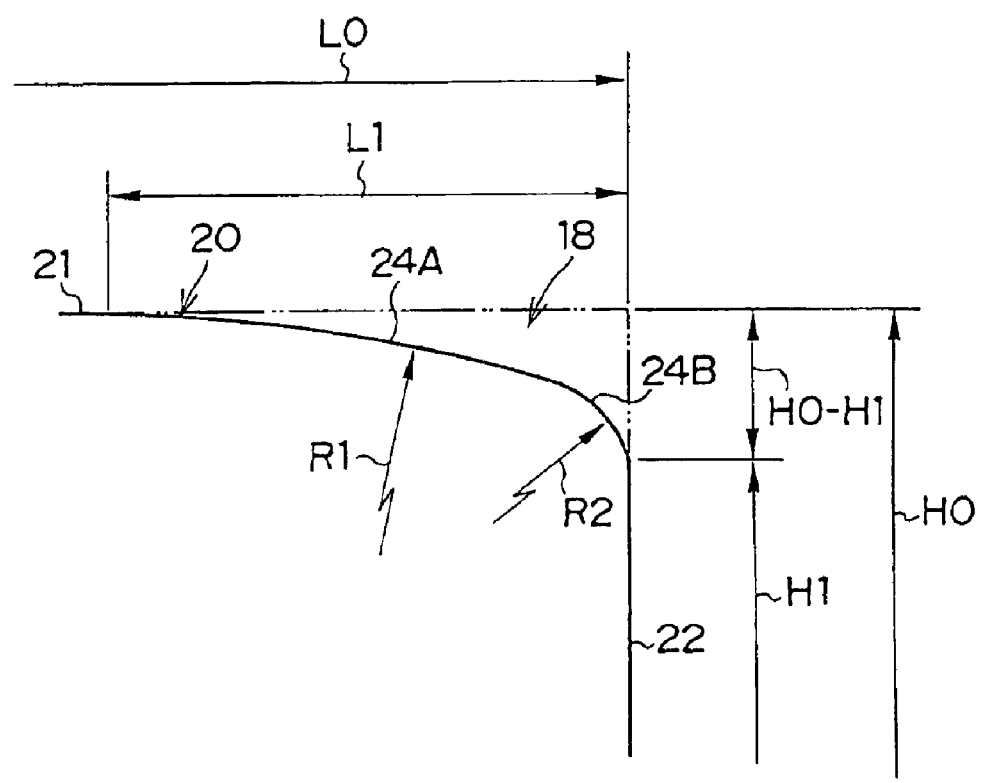
FIG. 5 is a cross sectional view showing an end of a block and the vicinity thereof according to still yet another example of the present invention.

There can be provided the following methods in this case:

(1) the chamfer (contour) form (cross sectional form) of the block is provided by continuously forming two types of tapers in which an angle of inclination θ of the block-end side 24B is larger than that of the block-center side 24A (see FIG. 3);

(2) the chamfer form of the block is provided by continuously forming the block-center side 24A formed as a taper, and the block-end side 24B formed as an R-shaped curved line, that is, a curved line having a fixed curvature (see FIG. 4); and (3) the chamfer form of the block is provided by continuously forming the block-center side 24A formed as a curved line having a radius of curvature R1, and the block-end side 24B formed as a curved line having a radius of curvature R2 (R1>R2) (see FIG. 5).

Among the above-described methods, it is desired that the methods (2) and (3) be used from the standpoint of equalization of ground contact pressure in the end of the block and the vicinity thereof.

In order to ascertain the above-described operational effects, a handling stability test was conducted.

Tires used for the test were radial tires whose size was 205/55R16. As illustrated in FIG. 2, a tread pattern of each tire is a combination of squares. The block size was 30 mm×30 mm and the height of the block was 10 mm.

First, in order to ascertain effects of the chamfer form, pneumatic tires of the following examples were used:

Example 1: a chamfer form formed by a taper portion and an R-shaped curve (see FIG. 4)

Example 2: a chamfer form formed by curved lines having radii of curvature R1 and R2 (R1>R2) (see FIG. 5)

Conventional example 1: no chamfer formed

Conventional example 2: a taper portion formed (see FIG. 22)

Figure 24:
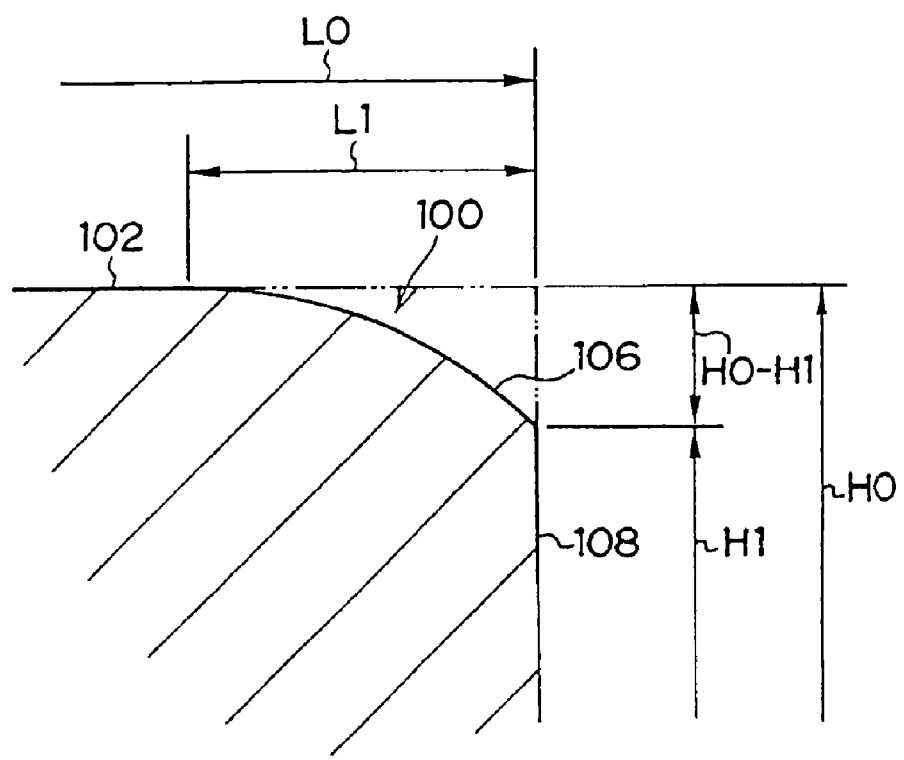
FIG. 24 is a cross sectional view showing an end of a block and the vicinity thereof in still another conventional example.

Conventional example 3: a chamfer form formed by an R-shaped curve only tangent to a ground contact surface of the block (see FIG. 24)

It is desirable that in Examples 1 and 2, the two curved lines be continuously connected to each other with a common tangent line at an intersection point. However, for the purpose of equalizing overall dimensions of the chamfer as far as possible, an approximate value which is close to a tangent continuous state is selected in this case.

Detailed dimensions are shown in Table 1.

A feeling evaluation was conducted with a vehicle to which the above-described tires were mounted and which was run by an experienced driver on a test course road. The evaluation was made as an index with the result of the tire of the conventional example 1 being 100. The higher the index, the better the feeling evaluation.

L0 indicates a transverse dimension of the block along the cross sectional direction, L1 indicates a transverse dimension of the block along the cross sectional direction from the groove wall surface 22 to a boundary between the chamfer portion 24 and the central portion 21.

H0 indicates the maximum height of the block and H1 indicates a height at an intersection point of the chamfer portion 24 and the groove wall surface 22.

The "height" mentioned herein means a dimension measured from the bottom of the main groove 14.

TABLE 1

| Chamfer form Block-center side | Chamfer form in a peripheral portion of block | L1/L0 | H1/H0 | H1 | Score Of Evaluation |
|---|---|---|---|---|---|
| Example 1 | Straight line (0.5 mm chamfered in 4 mm) | R4.0 | 0.2 | 0.85 | 1.5 | 115 |
| Example 2 | R16.25 | R4.0 | 0.2 | 0.85 | 1.5 | 122 |
| Conventional Example 1 | — | — | — | — | — | 100 |
| Conventional Example 2 | Straight line (1.5 mm chamfered in 6 mm) | ← | 0.2 | 0.85 | 1.5 | 108 |
| Conventional Example 3 | R12.75 | ← | 0.2 | 0.85 | 1.5 | 109 |

Next, in order to ascertain the difference in the effect based on the length L1 in the cross sectional direction to be chamfered in the case of "R1+R2" in which the most excellent effect was obtained (Example 2), Examples 1—1 to 1-5 and Conventional example 1—1 (no chamfer formed) were compared. The same testing method and evaluation method are used. The test results are shown in Table 2.

TABLE 2

| | L1/L0 | Score of evaluation |
|---|---|---|
| Example 1-1 | 0.01 | 106 |
| Example 1-2 | 0.02 | 112 |
| Example 1-3 | 0.15 | 122 |
| Example 1-4 | 0.29 | 114 |
| Example 1-5 | 0.31 | 107 |
| Conventional Example 1-1 | — | 100 |

Fixed condition:
H1/H0   H1
0.85    1.5

Further, in order to ascertain a desired height of chamfer in the case of "R1+R2", Examples 2-1 to 2-5 and Conventional Example 2-1 (no chamfer formed) were compared. The same testing method and evaluation method are used. The test results are shown in Table 3.

TABLE 3

| | H0-H1 | H1/H0 | Score of evaluation |
|---|---|---|---|
| Example 1-1 | 0.05 | 0.995 | 102 |
| Example 1-2 | 0.10 | 0.990 | 112 |
| Example 1-3 | 1.25 | 0.875 | 122 |
| Example 1-4 | 2.5 | 0.750 | 112 |
| Example 1-5 | 2.6 | 0.740 | 109 |
| Example 1-6 | 3.0 | 0.700 | 103 |
| Example 1-7 | 3.2 | 0.680 | 97 |
| Conventional Example 1 | — | — | 100 |

Fixed conditions:
L1/L0: 0.2 (two types of R: radius of curvature)

It can be seen from Table 1 that the chamfer form proposed by the present invention, which approximates to an actual ground contact pressure distribution, be effective. Although the conventional chamfered structure improves the performance as compared with no chamfer structure, the above-described evaluation was conducted assuming the desired standard in this case being 110 or greater, which greatly differs from the conventional examples.

A preferred chamfer dimension is determined based on the above-described standard. The block size varies for each block pattern. It is preferable from Table 2 that a chamfer length L1 be 0.02 to 0.3 with the cross sectional length L0 of the block (along the transverse direction of the tire) being 1.

Further, it is desired from Table 3 that the height of chamfer (H0–H1) be 0.1 to 2.5 mm. Furthermore, a desired effect can be recognized when the height position of the intersection point of the chamfer portion 24 and the groove wall surface 22 is approximately 0.7 or greater with respect to the height of the block being 1.

Moreover, even if an amount of chamfer is small (even if the height position of the intersection point is 0.995), the effect of an improvement in the handling stability is obtained.

The height position of the intersection point is more preferably 0.750 to 0.990.

[Second Embodiment]

Next, a second embodiment of pneumatic tire according to the present invention will be described. It should be noted that the same members as those of the first embodiment will be denoted by the same reference numerals, and a description thereof will be omitted.

Figure 6:
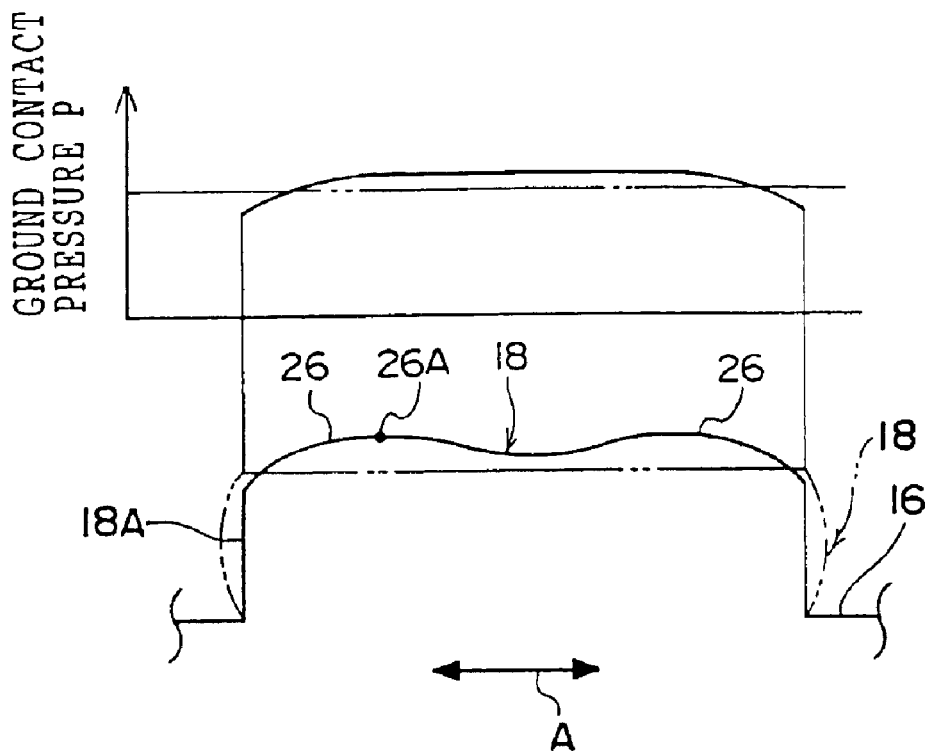
FIG. 6 is a cross sectional view of a block taken along a circumferential direction of a tire and a graph showing ground contact pressure at various positions on a tread surface of the block.
Figure 7:
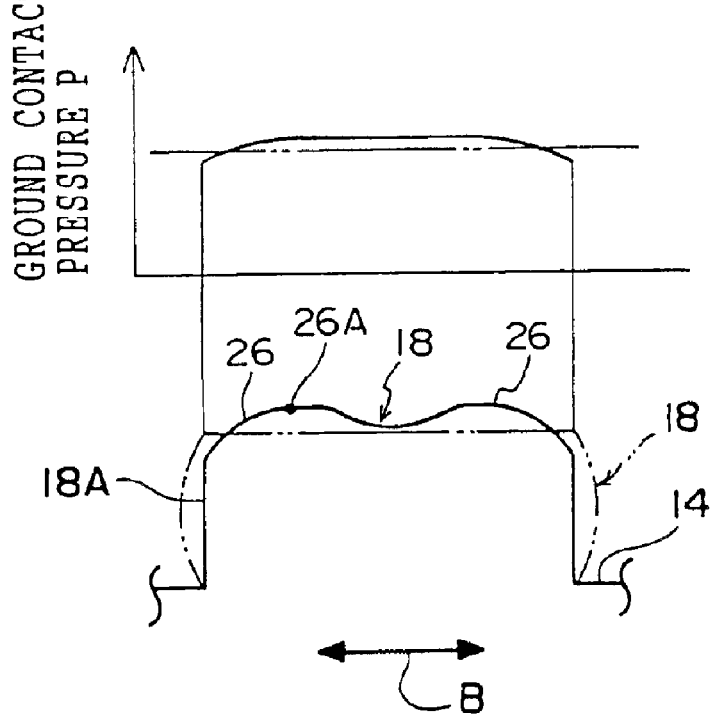
FIG. 7 is a cross sectional view of a block taken along a transverse direction of the tire and a graph showing ground contact pressure at various positions on the tread surface of the block.

FIG. 6 shows a cross section of the block 18 taken along the circumferential direction of a tire and FIG. 7 shows a cross section of the block 18 taken along the transverse direction of the tire.

As illustrated in FIGS. 6 and 7, a peripheral protuberant portion 26 is formed on a tread surface of the block 18 in the vicinities of end edges of the block 18 both in circumferential and transverse directions of the tire. In the present embodiment, the peripheral protuberant portion 26 is continuously formed along the outer periphery of the block 18.

A contour line of the peripheral protuberant portion 26 is preferably formed by a smooth curved line as shown in the above-described cross sectional views.

In the peripheral protuberant portion 26, a top 26A is positioned further at the inner side of the block than an extension line of a side surface (groove wall) 18A of the block 18 and the height of the block 18 gradually decreases from the top 26A toward the end edge of the block 18 and also toward the central portion of the block 18.

Next, a description will be given of preferable ranges of the dimensions of the peripheral protuberant portion of the block 18, and the like.

Figure 8:
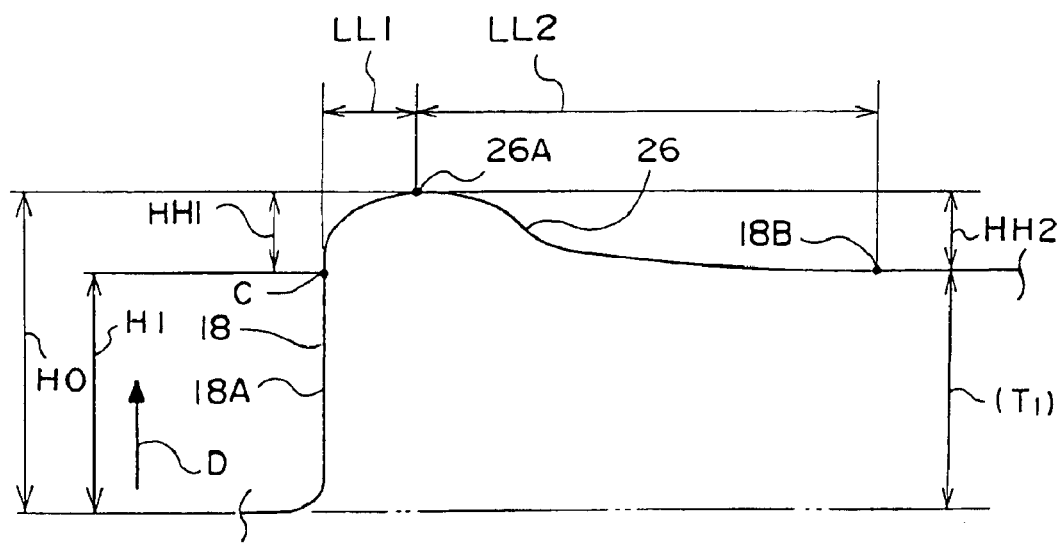
FIG. 8 is a cross sectional view showing a dimensional relationship of a peripheral protuberant portion.

(1) As shown in FIG. 8, when a distance measured from an intersection point C of the side surface 18A of the block 18 and the peripheral protuberant portion 26 to a height position of the top 26A of the peripheral protuberant portion 26 along the radial direction of a tire (that is, the direction indicated by arrow D) is indicated by HH1, the dimension HH1 is preferably in the range from 0.1 to 2.5 mm.

(2) When a distance measured from a maximum depth portion 18B at the central region of the block 18 to the height position of the top 26A of the peripheral protuberant portion 26 along the radial direction of the tire is indicated by HH2, the dimension HH2 is preferably in the range from 0.1 to 2.5 mm.

(3) It is preferable that HH2/HH1 is 1.5 or less.

(4) When a distance measured from the intersection point C to the top 26A in the direction along the tread surface of the block 18 is indicated by LL1, the dimension LL1 is preferably 10.0 mm or less.

(5) When a distance measured from the top 26A to the maximum depth portion 18B in the direction along the tread surface of the block 18 is indicated by LL2, LL1/LL2 is preferably 2.0 or less.
(6) It is preferable that HH1/LL1 is 1.0 or less.
(7) It is preferable that HH2/LL2 is 1.0 or less.
(8) The ratio between the maximum height H0 of the block 18 and the minimum height T1 of the block 18, that is, T1/H0 is preferably in the range of 0.75<T1/H0<1.0 (see FIG. 8; the position of the minimum height T1 may be provided at the end edge of the block or at the central portion of the block).

Operation:

Next, operation of the pneumatic tire 10 according to the second embodiment will be described.

When a block having a fixed height contacts the road surface, the ground contact pressure becomes especially large at a ground-contact end of the block and also becomes large at the central portion of the block, and becomes relatively small in a region between the ground-contact end and the central portion of the block. However, in a case in which as illustrated in FIGS. 6 and 7, as the peripheral protuberant portion 26 is formed on the tread surface of the block 18 in the vicinity of the end edge of the block in such a manner that the height of the block gradually decreases toward the end edge of the block and also toward the central portion of the block, the ground contact pressure at the end edge of the block and at the central portion of the block can be reduced when the block contacts the road surface (the states indicated by the phantom lines in FIGS. 6 and 7). As can be seen from the graphs of ground contact pressure in FIGS. 6 and 7, the ground contact pressure can be equalized both in the circumferential and axial directions of the tire.

In the present embodiment, ununiformity of the ground contact pressure in the circumferential direction of the tire can be prevented due to the peripheral protuberant portion 26 being formed at both sides of the block 18 in the circumferential direction of the tire. Therefore, occurrence of a buckling phenomenon caused by braking/driving force can be prevented and handling stability can be improved. Further, uneven wear in the vicinities of circumferential direction ends of the tire, caused by uniformity of the ground contact pressure in the circumferential direction of the tire, can be suppressed.

Moreover, since the peripheral protuberant portion 26 is also provided at both lateral ends of the tire, generation of uneven wear in the vicinities of lateral ends of the tire, caused by ununiformity of the ground contact pressure in the transverse direction of the tire, can be suppressed.

When the dimension HH1 is set in the range from 0.1 to 2.5 mm, ununiformity of the ground contact pressure can be prevented without reducing a ground-contacting area at the end edge of the block.

When the dimension HH2 is set in the range from 0.1 to 2.5 mm, the ground contact pressure at the central portion of the block can reliably be reduced without reducing a ground-contacting area at the central portion of the block.

When the ratio HH2/HH1 is set to be 1.5 or less, the ground contact pressure in the vicinity of the maximum depth portion of the block (at the central portion of the block) and the ground contact pressure of the top 26A of the peripheral protuberant portion 26 approximate to each other when the block 18 contacts the road surface. Therefore, the above-described numerical range is preferable.

It is preferable that the dimension LL1 is 10.0 mm or less so as to allow further equalization of the ground contact pressure.

It is preferable that LL1/LL2 is 2.0 or less so as to equalize the distribution of ground contact pressure of the rectangular block 18.

It is preferable that HH1/LL1 is 1.0 or less so as to realize a uniform state of the ground contact pressure.

It is preferable that HH2/LL2 is 1.0 or less so as to enhance the effect of equalization of the ground contact pressure distribution.

Further, if the ratio between the maximum height H0 of the block 18 and the minimum height T1 of the block 18 (T1/H0) is set such that $0.75 \leq T1/H0 < 1.0$, the ground contact area is maintained and the effect of reducing the ground contact pressure can reliably be obtained. Therefore, the above-described range is preferable.

The test results on which the above-described numerical determination is based are shown below.

These test results are evaluation results of handling stability obtained by using an actual vehicle, and are each expressed as an index with the tire having the conventional block with no chamfer being 100. The higher the index, the better the performance. Further, the above-described evaluation was conducted assuming the desired standard being 110 or greater, which greatly differs from the conventional example.

FIG. 12 shows the evaluation results when the dimension HH1 measured from the intersection point C of the side surface 18A of the block 18 and the peripheral protuberant portion 26 to the height position of the top 26A of the peripheral protuberant portion 26 along the radial direction of the tire is changed at different values.

It can be seen from the above-described results that the proper value of the dimension HH1 is 0.1 to 2.5 mm, more preferably 0.5 to 1.2 mm. Further, when compared with the block in which only chamfer is provided, it can be seen that change in chamfering on the periphery of the block produces still more excellent effect.

FIG. 13 shows the evaluation results when the dimension H2 measured from the maximum depth portion 18B at the central region of the block 18 to the height position of the top 26A of the peripheral protuberant portion 26 along the radial direction of the tire is changed at different values.

It can be seen that the proper value in this case be desirably set at similar values to those of a corner portion in the cross section of the block.

FIG. 14 shows the evaluation results when the ratio HH2/HH1 is changed at different values.

It can be seen from the above-described results that an excellent effect can be obtained when the ratio HH2/HH1 is approximately 1.5 or less. From the standpoint of obtaining the excellent effect, the HH2/HH1 is more desirably in the range of 0.15 to 1.0.

FIG. 15 shows the evaluation results when the dimension LL1 measured from the intersection point C to the height position of the top 26A in the direction along the tread surface of the block 18 is changed at different values.

At this time, the dimension LL2 which is a distance from the top 26A to the maximum depth portion 18B in the direction along the tread surface of the block 18 is given by subtracting the dimension LL1 from a half of the block length of the cross section in the transverse direction thereof (with the maximum depth portion 18B positioned at the central region of the block). It can be seen from the result that an excellent effect is exhibited when the dimension LL1 is 10 mm or less. Further, it can also be seen that the ratio LL1/LL2 in this case be 2.0 or less. In order to obtain the most excellent effect, the dimension LL1 is set in the range from 1 to 6 mm. It can be seen that in this case the ratio LL1/LL2 is approximately in the range from 0.1 to 0.7. That is, the above-described numerical ranges indicates that the dimension LL1 at the side near the end of the block in the cross section is preferably shorter.

FIG. 16 shows the evaluation results when the ratio HH1/LL1 is changed at different values.

It can be seen from the above-described results that a desired effect is exhibited when the ratio HH1/LL1 is 1.0 or less and an excellent effect is exhibited when the ratio HH1/LL1 is in the range from 0.1 to 0.7. The most excellent effect is exhibited when the ratio is in the range from 0.1 to 0.5.

FIG. 17 shows the evaluation results when the relationship between HH2 and LL2 is changed in various manners.

It can be seen from the above-described results that a desired effect is exhibited when the ratio HH2/LL2 is 1.0 or less, more preferably in the range from 0.06 to 1.0. The most excellent effect can be obtained when the ratio is approximately in the range from 0.1 to 0.4.

In either case, the evaluation result obtained by using an actual vehicle indicates that further improvement in the performance can be expected by changing chamfering on the circumference of the block. The reason is, as is considered, that a proper distribution of chamfering exists with respect to the ground-contacting characteristics influenced by the shape of the block itself.

[Other embodiments]

In the above-described embodiment, the circumferential groove 14 extends along the circumferential direction of the tire (i.e., the direction indicated by arrow A) and the lateral groove 16 extends along the transverse direction of the tire (i.e., the direction indicated by arrow B). However, the present invention is not limited to the same. The circumferential groove 14 may be inclined with respect to the circumferential direction of the tire and the lateral groove 16 may be inclined with respect to the transverse direction of the tire.

Further, the block 18 of the above-described embodiment is rectangular, but the present invention is not limited to the same. The shape of the block 18 when the tread 12 is seen from above may be a polygon such as a diamond shape, a hexagon, or an octagon depending on orientation of the circumferential groove 14 and the lateral groove 16, or provision of chamfering, notching, or the like. Alternatively, as shown in FIG. 18A, the block 18 may have a substantially U-shaped configuration or may also have a circular or ellipsoidal configuration.

Figure 18A:
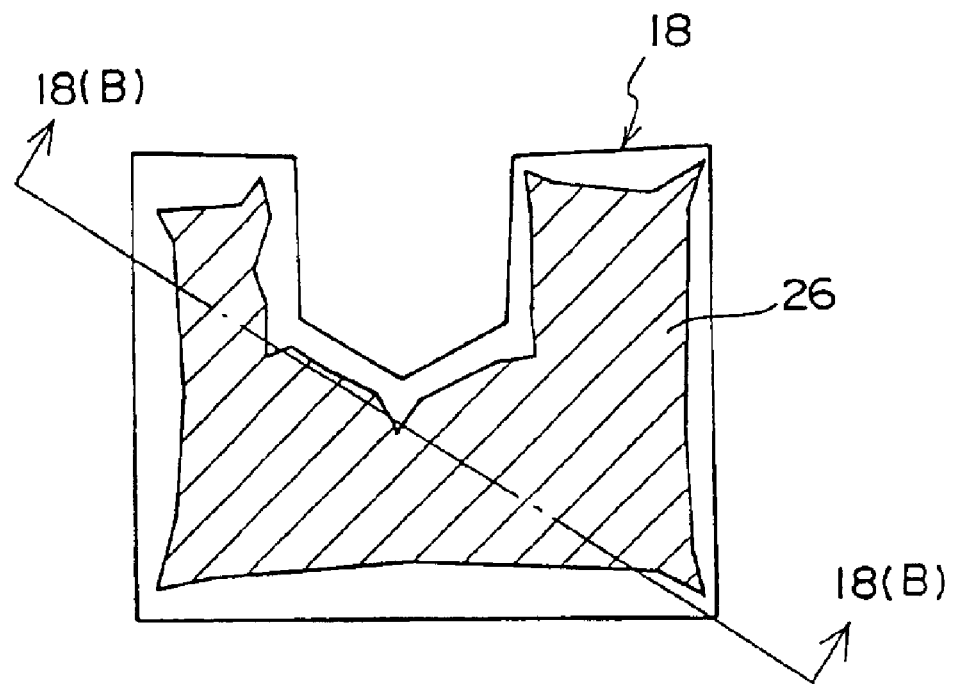
FIG. 18A is a plan view of a block of a pneumatic tire according to another embodiment of the present invention.
Figure 18B:
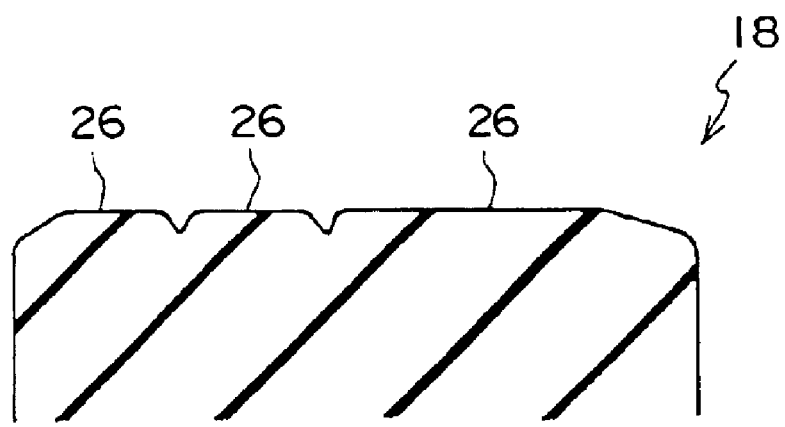
FIG. 18B is a cross sectional view taken along the line 18(B)—18(B) in FIG. 18A.

In the block 18 shown in FIG. 18A, the peripheral protuberant portion 26 (in this drawing, a region indicated by hatched lines) is formed along the end edge of the block. As shown in the cross sectional view of FIG. 18B, the peripheral protuberant portion 26 is provided at three locations in the cross section, that is, at both end edges of the block and at the central portion thereof, depending on a position at which the block 18 is cut.

TEST EXAMPLES

In order to ascertain the effects of the present invention, eight types of tires according to examples to which the present invention is applied, and one type of conventional tire were prepared. The handling stability and ride comfort characteristic were evaluated by tests conducted with an actual vehicle.

Figure 25:
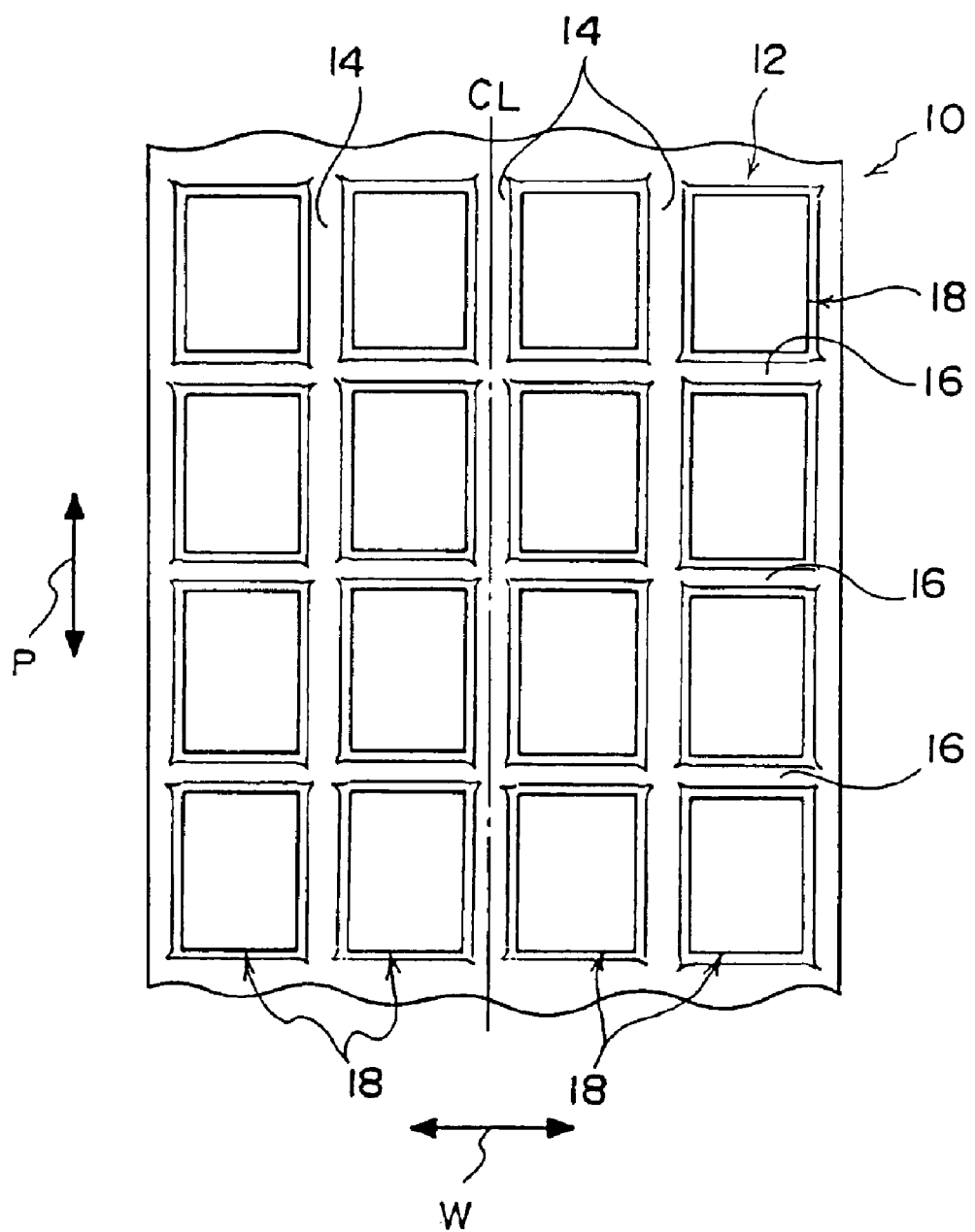
FIG. 25 is a plan view of a tread in a test example.

The tire size of each tire was 195/50R15 (having a tread pattern shown in FIG. 25) and a test using an actual vehicle was conducted with the tires filled with an internal pressure of 2.0 kg/cm$^2$.

Further, the block size was 30 mm (in the circumferential direction of the tire)×20 mm (in the transverse direction of the tire)×9 mm (in the height of the tire).

The evaluation are shown in Table 4 below. This is a feeling evaluation by a test driver, and is expressed as an index with the conventional tire being 100. Further, the larger the value, the better the performance. Further, in the automobile market, so long as the index is 110 or high, an improvement in the performance is clearly recognized.

TABLE 4

| | Results obtained by using an actual vehicle | | | | | | |
|---|---|---|---|---|---|---|---|
| | LL1(mm) | HH1(mm) | LL2(mm) | HH2(mm) | | Performance | |
| | Maximum value | Maximum value | Maximum value | maximum value | T1/H0 | Handling stability | Riding comfort |
| Conventional Example | — | — | — | — | 1.0 | 100 | 100 |
| Example 1 | 1.0 | 0.3 | 17.0 | 0.2 | 0.97 | 112 | 100 |
| Example 2 | 1.5 | 0.3 | 16.5 | 0.4 | 0.96 | 114 | 100 |
| Example 3 | 3.0 | 0.4 | 15.0 | 0.3 | 0.96 | 115 | 100 |
| Example 4 | 4.0 | 0.8 | 14.0 | 0.6 | 0.91 | 121 | 98 |
| Example 5 | 5.0 | 0.9 | 13.0 | 0.6 | 0.90 | 118 | 99 |
| Example 6 | 6.0 | 1.0 | 12.0 | 1.0 | 0.88 | 116 | 99 |
| Example 7 | 8.0 | 1.5 | 10.0 | 1.0 | 0.83 | 112 | 98 |
| Example 8 | 10.0 | 2.5 | 8.0 | 2.0 | 0.72 | 108 | 98 |

It can be seen that in the tires of Examples 1 to 8 to which the present invention is applied, the handling stability is improved as compared with the conventional tire.

Further, in the tire of Example 4 which was evaluated most highly, the ground contact pressure was evaluated below in the following tables 5 and 6.

TABLE 5

Comparison of standard deviation of ground contact pressure between the conventional tire and the tire of Example 4

|  | Conventional tire | Tire of Example 4 |
| --- | --- | --- |
| Input 1 | 100 | 66 |
| Input 2 | 100 | 55 |
| Input 3 | 100 | 54 |
| Input 4 | 100 | 51 |
| Input 5 | 100 | 54 |
| Input 6 | 100 | 55 |
| Input 7 | 100 | 54 |
| Input 8 | 100 | 51 |
| Input 9 | 100 | 54 |
| Average of total input | 100 | 55 |

TABLE 6

Comparison of ground-contacting area between the conventional tire and the tire of Example 4

|  | Conventional tire | Tire of Example 4 |
| --- | --- | --- |
| Input 1 | 100 | 101 |
| Input 2 | 100 | 101 |
| Input 3 | 100 | 100 |
| Input 4 | 100 | 100 |
| Input 5 | 100 | 100 |
| Input 6 | 100 | 101 |
| Input 7 | 100 | 100 |
| Input 8 | 100 | 100 |
| Input 9 | 100 | 100 |
| Average of total input | 100 | 100 |

Figure 9:
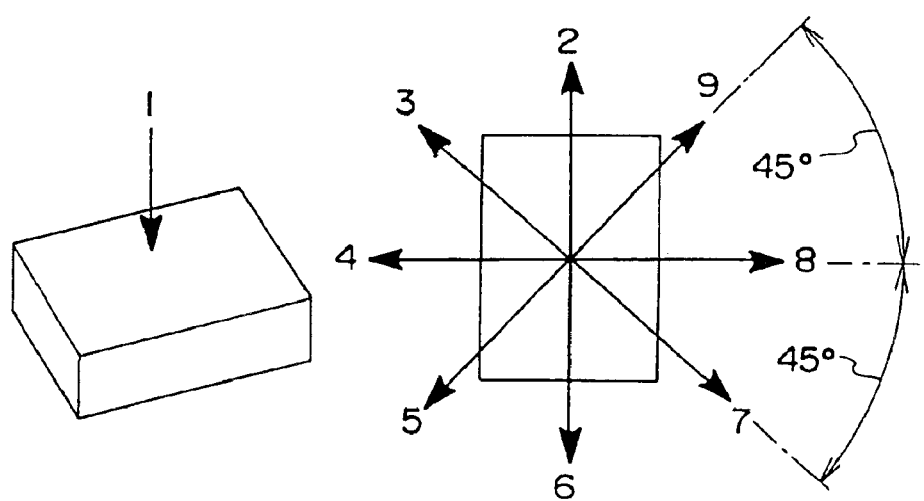
FIG. 9 is a diagram for illustrating directions in which input acts at the time of a test.

The input conditions and input numbers taken into consideration at this time are shown in FIG. 9.

The input 1 is applied under a vertical load condition (corresponding to bearing stress of 4 kgf/cm$^2$). The input 2 to 8 are shearing force input in directions shown in FIG. 9 (evaluation with an amount of shear deformation of 1 mm).

In Table 5, the degree of equalization of ground contact pressure on a tread surface of a block is expressed as an index for each input. The result of the above-described comparison indicates that ununiformity of the ground contact pressure is improved by 45%, on the average, in the standard deviation of ground contact pressure in a ground-contacting area.

Further, in Table 6 in which an area of the ground-contacting area of the block is shown for each input, it is suggested that the above-described improvement has been made without reducing the ground-contacting area and other performances are not apt to be adversely affected.

Figure 10:
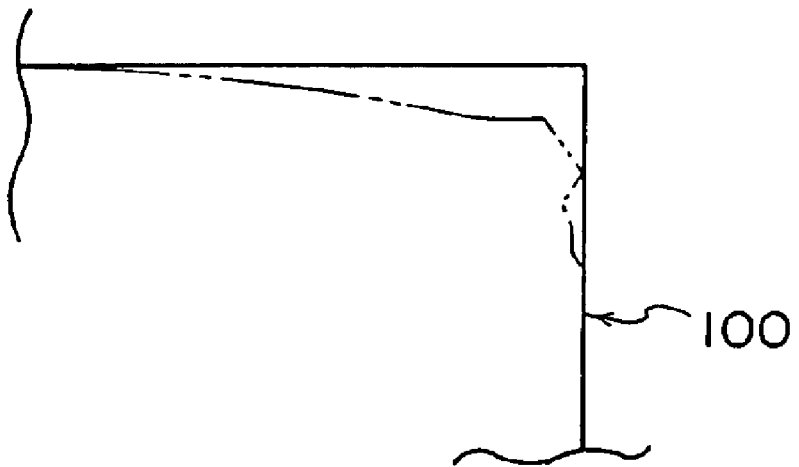
FIG. 10 is a cross sectional view of a conventional block, which shows a worn state of the block.
Figure 11:
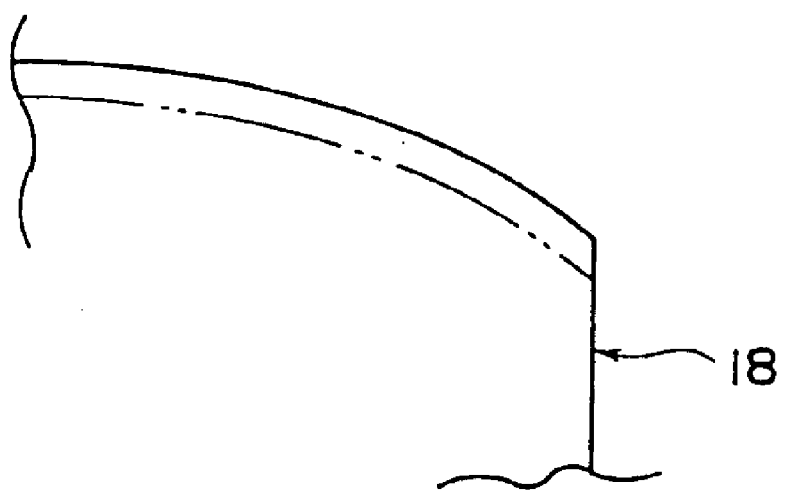
FIG. 11 is a cross sectional view of a block of a fourth embodiment of the present invention, which shows a worn state of the block.

The worn state of the block of Example 4 is shown in FIG. 11 and the worn state of the block in the conventional tire is shown in FIG. 10. In each of the drawings, the solid line indicates a cross section in the vicinity of the ground-contacting end of the block before wear, and the phantom line indicates a cross section in the vicinity of the ground-contacting end of the block after wear.

In the block of the conventional tire, the ground-contacting end is locally and severely worn as shown in FIG. 10.

In the block of Example 4, a uniform worn state is realized as shown in FIG. 11.

It can be ascertained from the foregoing that local uneven wear be suppressed by making the tread surface of the block into a proper shape.

What is claimed is:

1. A pneumatic tire comprising a tread including a plurality of blocks demarcated by circumferential grooves extending in a circumferential direction of the tire and grooves intersecting the circumferential grooves,
    wherein a peripheral protuberant portion is formed on a tread surface of each block in the vicinity of an end edge thereof so that the height of the block gradually and continuously decreases from a top of the peripheral protuberant portion to a groove wall surface of the block and from the top of the peripheral protuberant portion to a maximum depth portion in a central region of the block, and
    wherein said peripheral protuberant portion extending from the top of the peripheral protuberant portion to the groove wall surface defines a chamfer portion, and an angle formed by a tangential line of the chamfer portion with respect to a horizontal extension line of the surface of the top of the peripheral protuberant portion in a heightwise cross section perpendicular to the groove wall surface increases from the top of the peripheral protuberant portion to the groove wall surface; the chamfer portion having a radius of curvature R1 at a block center side and a radius of curvature R2 at a block end side wherein the radius of curvature R1 is greater than the radius of curvature R2;
    wherein the peripheral protuberant portion is disposed in vicinities of the end edges on at least one side of the block in a transverse direction of the tire; and
    a dimension HH1 measured along a radial direction of the tire, between an intersection point of a groove wall surface of the block and the peripheral protuberant portion, and a height position of the top of the peripheral protuberant portion is greater than 0.5 mm and less than or equal to 2.5 mm.

2. A pneumatic tire according to claim 1, wherein the peripheral protuberant portion is formed in both end edges of the block in the transverse direction of the tire.

3. A pneumatic tire according to claim 1, wherein a dimension HH2 measured along the radial direction of the tire, between the maximum depth portion in the central region of the block and the height position of the top of the peripheral protuberant portion is in the range from 0.1 to 2.5 mm.

4. A pneumatic tire according to claim 1, wherein the ratio between the dimension HH1 measured along the radial direction of the tire, between the maximum depth portion in the central region of the block and the height position of the top of the peripheral protuberant portion, that is, HH2/HH1, is 1.5 or less.

5. A pneumatic tire according to claim 1, wherein a dimension LL1 measured in a direction of the tread surface, between the intersection point of the groove wall surface of the block and the peripheral protuberant portion, and the top of the peripheral protuberant portion is 10.0 mm or less.

6. A pneumatic tire according to claim 1, wherein the ratio between a dimension LL1 measured in a direction along the tread surface, between the intersection point of the groove wall surface of the block and the peripheral protuberant portion, and the top of the peripheral protuberant portion, and a dimension LL2 measured in the direction along the tread from the top of the peripheral protuberant portion to the maximum depth portion in the central region of the block, that is, LL1/LL2 is 2.0 or less.

7. A pneumatic tire according to claim 1, wherein the ratio between the dimension HH1 measured in a direction along the tread surface, between the intersection point of the groove wall surface of the block and the peripheral protuberant portion, and the top of the peripheral protuberant portion, that is, HH1/LL1 is 1.0 or less.

8. A pneumatic tire according to claim 1, wherein the ratio between a dimension HH2 measured along the radial direction of the tire, between the maximum depth portion in the central region of the block and the height position of the top of the peripheral protuberant portion, and a dimension LL2 measured in the direction along the tread from the top of the peripheral protuberant portion to the maximum depth portion in the central region of the block, that is, HH2/LL2 is 1.0 or less.

9. A pneumatic tire according to claim 1, wherein the ratio between the maximum height HO and the minimum height T1 of the block, that is, T1/H0 is set in the range of $0.75 \leq T1/H0 < 1.0$.

10. A pneumatic tire according to claim 1, wherein the peripheral protuberant portion is formed along an entire periphery of the end edge of the block.

11. A pneumatic tire according to claim 1, wherein said angle increases smoothly toward the side of the block end.

* * * * *